United States Patent
Yang et al.

(10) Patent No.: US 12,315,213 B2
(45) Date of Patent: May 27, 2025

(54) MEDICAL IMAGE PROCESSING APPARATUS AND MEDICAL IMAGE PROCESSING METHOD

(71) Applicant: CANON MEDICAL SYSTEMS CORPORATION, Tochigi (JP)

(72) Inventors: Hong Yang, Beijing (CN); Chunqi Wang, Beijing (CN); Zhen Zhou, Beijing (CN)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 345 days.

(21) Appl. No.: 17/818,791

(22) Filed: Aug. 10, 2022

(65) Prior Publication Data

US 2023/0054641 A1 Feb. 23, 2023

(30) Foreign Application Priority Data

Aug. 20, 2021 (CN) .......................... 202110959382.0
May 11, 2022 (JP) ................................. 2022-077915

(51) Int. Cl.
*G06K 9/00* (2022.01)
*G06T 7/00* (2017.01)
(Continued)

(52) U.S. Cl.
CPC ............ *G06V 10/42* (2022.01); *G06T 7/0014* (2013.01); *G06T 7/74* (2017.01); *G06V 10/764* (2022.01);
(Continued)

(58) Field of Classification Search
CPC .... G06V 10/42; G06V 10/764; G06V 10/778; G06V 2201/03; G06T 7/0014;
(Continued)

(56) References Cited

U.S. PATENT DOCUMENTS 10,210,613 B2 * 2/2019 Xu ........................ A61B 5/4887
10,297,027 B2 * 5/2019 Scutaru .................. G06V 10/85
(Continued)

FOREIGN PATENT DOCUMENTS

| JP | 2009-129237 A | 6/2009 |
|---|---|---|
| JP | 2015-036123 A | 2/2015 |
| JP | 2016-036685 A | 3/2016 |

OTHER PUBLICATIONS

Collaborative Regression-based Anatomical Landmark Detection, Yaozong Gao et al., HHS, 2015, pp. 9377-9401 (Year: 2015).*

(Continued)

*Primary Examiner* — Jayesh A Patel
(74) *Attorney, Agent, or Firm* — Oblon, McClelland, Maier & Neustadt, L.L.P.

(57) ABSTRACT

A medical image processing apparatus according to an embodiment includes processing circuitry. The processing circuitry detects, for each of target points corresponding to feature points, a reference point having a spatial correlation with the target point in a medical image. The processing circuitry generates candidate points corresponding to the target point for each of the target points by using a detection model. The processing circuitry selects, for each of the target points, a candidate point based on a position feature indicating a spatial position relationship between the target point and the reference point. The processing circuitry selects, for each of a plurality of candidate point combinations, a candidate point combination based on a structural feature indicating a spatial structural relationship between the target points. The processing circuitry outputs feature points in the medical image based on the selected candidate point and candidate point combination.

13 Claims, 11 Drawing Sheets

(51) Int. Cl.
*G06T 7/73* (2017.01)
*G06V 10/42* (2022.01)
*G06V 10/764* (2022.01)
*G06V 10/778* (2022.01)

(52) U.S. Cl.
CPC .. *G06V 10/778* (2022.01); *G06T 2207/20076* (2013.01); *G06T 2207/20081* (2013.01); *G06T 2207/30004* (2013.01); *G06V 2201/03* (2022.01)

(58) Field of Classification Search
CPC ............ G06T 7/74; G06T 2207/20076; G06T 2207/20081; G06T 2207/30004
See application file for complete search history.

(56) References Cited

U.S. PATENT DOCUMENTS

| | | | | |
|---|---|---|---|---|
| 12,067,678 B2* | 8/2024 | Zhang | ............... | G06T 17/20 |
| 2009/0136137 A1* | 5/2009 | Kozakaya | ............ | G06V 10/464 |
| | | | | 382/195 |
| 2013/0336553 A1* | 12/2013 | Buisseret | ............... | G06T 7/13 |
| | | | | 382/128 |
| 2014/0270433 A1* | 9/2014 | Gulaka | ............... | G06T 7/75 |
| | | | | 382/128 |
| 2015/0043772 A1* | 2/2015 | Poole | ............... | G06F 18/2431 |
| | | | | 382/103 |
| 2016/0042248 A1* | 2/2016 | Endo | ............... | A61B 8/523 |
| | | | | 382/131 |
| 2022/0254104 A1* | 8/2022 | Zhang | ............... | G06T 17/20 |

OTHER PUBLICATIONS

Robust Multi-Scale Anatomical Landmark Detection in Incomlete 3D-CT Data, MICCAI, 2017, pp. 1-8. (Year: 2017).*

Gao, Y. et al. "Collaborative Regression-based Anatomical Landmark Detection", Phys Med Biol. Author manuscript; available in PMC Dec. 21, 2016. https://www.ncbi.nlm.nih.gov/pmc/articles/PMC4833677/ , 45 pages.

Ghesu, F. et al. "Robust Multi-scale Anatomical Landmark Detection in Incomplete 3D-CT Data", Medical Image Computing and Computer Assisted Intervention—MICCAI 2017. https://www5.informatik.unlerlangen.de/Forschung/Publikationen/2017/Ghesu17-RMA.pdf , 8 pages.

* cited by examiner

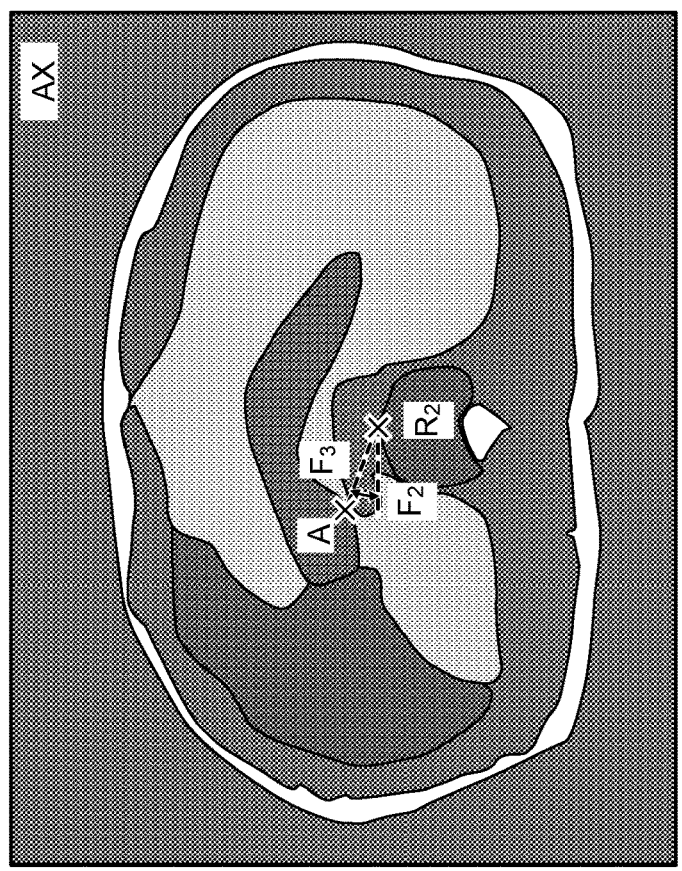
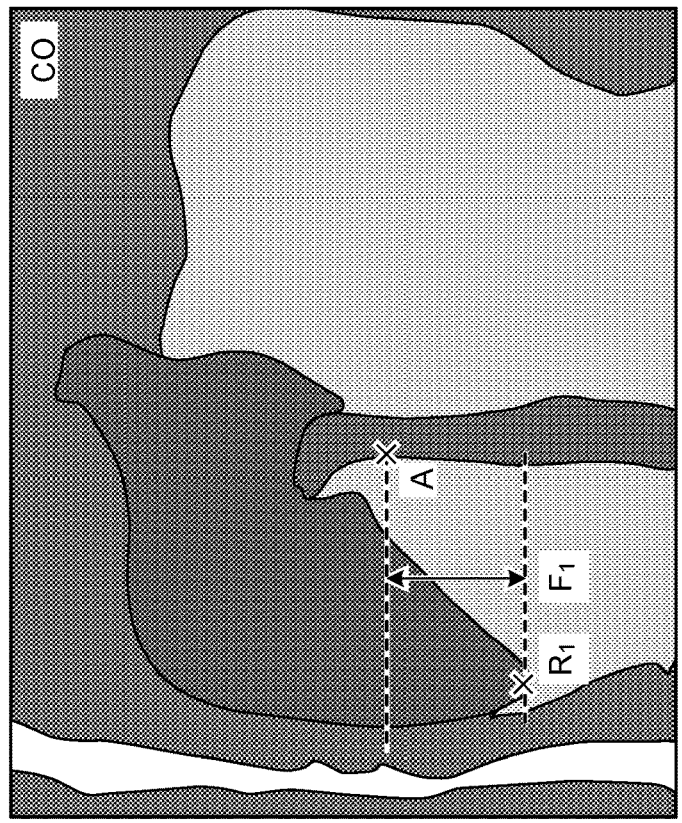
FIG.12

MEDICAL IMAGE PROCESSING APPARATUS AND MEDICAL IMAGE PROCESSING METHOD

CROSS-REFERENCE TO RELATED APPLICATIONS

This application is based upon and claims the benefit of priority from Chinese Patent Application No. 202110959382.0, filed on Aug. 20, 2021; and Japanese Patent Application No. 2022-077915, filed on May 11, 2022, the entire contents of all of which are incorporated herein by reference.

FIELD

Embodiments described herein relate generally to a medical image processing apparatus and a medical image processing method.

BACKGROUND

Detection of feature points is important when performing image processing on a medical image obtained by imaging a subject. Particularly, for example, when performing image processing such as positioning, segmentation, and quantitative analysis on the medical image, it is required to accurately detect feature points in the medical image, and another image processing is performed on the medical image on the basis of the detected feature points.

In the related art, there is a method of generating a learning model using machine learning including deep learning and predicting the position of a feature point in a medical image on the basis of the learning model. However, such a method has difficulty in detecting feature points in a specific medical image and has a problem in that the detection rate of feature points is low.

For example, as an example of the related art, there is a method of accurately detecting a target feature point in a medical image by using, as a reference point, a target having a stable position and obvious features and being easily detected, such as a bone, and excluding candidate feature points in abnormal positions from a plurality of detected candidate feature points on the basis of spatial constraints such as distance limitations between the target feature point and the reference point. Furthermore, for example, as another example of the prior art, there is a method of generating a combined detection model capable of predicting a plurality of target feature points by using a machine learning method. The combined detection model simultaneously predicts the positions of a plurality of target feature points by learning the features of the target feature points themselves and a relative relationship between the target feature points during a learning stage.

However, since the method of detecting feature points on the basis of reference points does not implement the definition of spatial constraints with a high degree of accuracy, when there are many interfering tissues near the target feature point, such as the presence of the intestine near the end of, for example, the pancreas, a plurality of similar target feature points each satisfying preset spatial constraints may be detected simultaneously. This results in a lower detection rate of feature points because points that are the result of detection may not be desired target feature points. Furthermore, the method of predicting target feature points on the basis of a relative relationship between the target feature points can only be applied when the positional relationship between the target feature points is stable. For example, human organs such as soft tissues vary greatly in positions in medical images of different subjects because of the existence of individual differences. Therefore, using the relative relationship between the target feature points in such a case results in a lower detection rate of feature points because accurate detection of each feature point may not be guaranteed.

BRIEF DESCRIPTION OF THE DRAWINGS

FIG. 12 is a schematic diagram illustrating an example of the position feature distribution according to the first embodiment.

DETAILED DESCRIPTION

Figure 1:
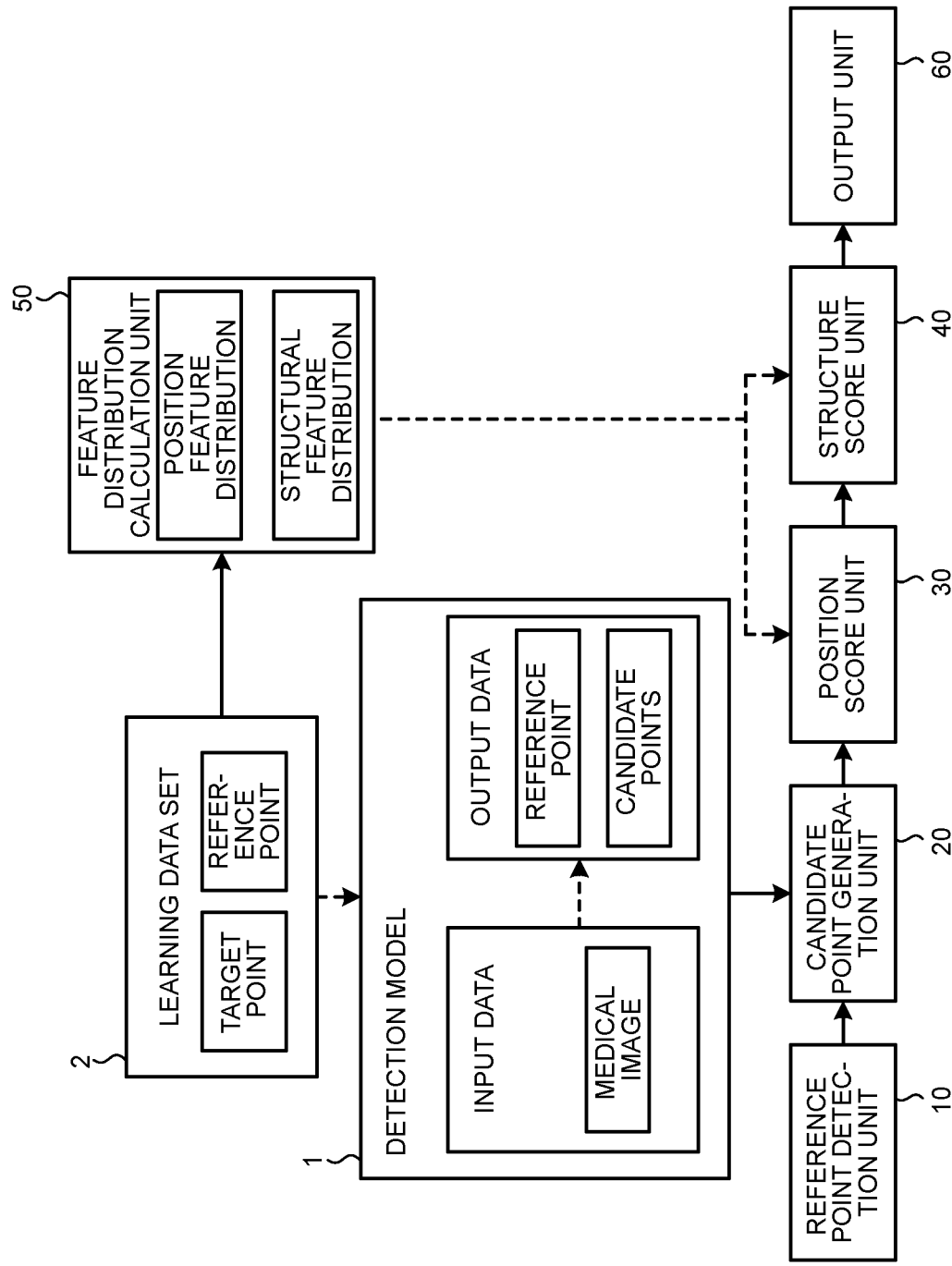
FIG. 1 is a block diagram illustrating a functional configuration of a medical image processing apparatus according to a first embodiment.

A medical image processing apparatus according to embodiments is a medical image processing apparatus for detecting a plurality of feature points in a medical image, and includes a reference point detection unit, a candidate point generation unit, a position score unit, a structure score unit, and an output unit. The reference point detection unit detects, for each of a plurality of target points corresponding to the feature points, a reference point having a spatial correlation with the target point in the medical image. The candidate point generation unit generates a plurality of candidate points corresponding to the target point for each of the target points by using a detection model. The position score unit scores, for each of the target points, a position score for the candidate points on the basis of a position feature indicating a spatial position relationship between the target point and the reference point in the medical image, and selects, for each of the target points, a candidate point having the position score satisfying a preset condition. The structure score unit scores, for each of a plurality of candidate point combinations obtained by combining the candidate points among the target points, a structural score for the candidate point combination on the basis of a structural feature indicating a spatial structural relationship between the target points in the medical image, and selects, for each of the candidate point combinations, a candidate point combination having the structural score satisfying a preset condition. The output unit outputs the feature points on the basis of the candidate point selected by the position score unit and the candidate point combination selected by the structure score unit.

Hereinafter, embodiments of the medical image processing apparatus and the medical image processing method are described in detail with reference to the drawings.

A medical image processing apparatus according to an embodiment is a medical image processing apparatus for detecting a plurality of feature points in a medical image, and includes a reference point detection unit, a candidate point generation unit, a position score unit, a structure score unit, and an output unit. The reference point detection unit detects, for each of a plurality of target points corresponding to the feature points, a reference point having a spatial correlation with the target point in the medical image. The candidate point generation unit uses a detection model and generates a plurality of candidate points corresponding to the target point with respect to each of the target points. The position score unit scores, for each of the target points, a position score for the candidate points on the basis of a position feature indicating a spatial position relationship between the target point and the reference point in the medical image, and selects a candidate point having the position score satisfying a preset condition. The structure score unit scores, for each of a plurality of candidate point combinations obtained by combining the candidate points among the target points, a structural score for the candidate point combination on the basis of a structural feature indicating a spatial structural relationship between the target points in the medical image, and selects a candidate point combination having the structural score satisfying a preset condition. The output unit outputs the feature points on the basis of the candidate point selected by the position score unit and the candidate point combination selected by the structure score unit.

In accordance with the medical image processing apparatus according to an embodiment, the position score unit selects a plurality of candidate points having the position score satisfying the condition from the candidate points generated by the candidate point generation unit. Furthermore, the structure score unit selects a candidate point combination having the structural score satisfying the condition from a plurality of candidate point combinations obtained by combining the candidate points selected by the position score unit. Furthermore, the output unit outputs, as the feature points, a plurality of candidate points included in the candidate point combination selected by the structure score unit.

In accordance with the medical image processing apparatus according to an embodiment, the structure score unit selects a candidate point combination having the structural score satisfying the condition from a plurality of candidate point combinations obtained by combining the candidate points generated by the candidate point generation unit. Furthermore, the position score unit selects a plurality of candidate points having the position score satisfying the condition from a plurality of candidate points included in the candidate point combination selected by the structure score unit. Furthermore, the output unit outputs, as the feature points, the candidate points selected by the position score unit.

With this, a position score and a structural score are scored for a plurality of candidate points for a target point on the basis of a position feature and a structural feature, and a candidate point having a position score and a structural score satisfying a predetermined condition is selected as a feature point, so that it is possible to accurately detect a plurality of feature points in a medical image at the same time.

The medical image processing apparatus according to an embodiment further includes a feature distribution calculation unit that calculates a position feature distribution indicating a probability distribution of the position feature and a structural feature distribution indicating a probability distribution of the structural feature, on the basis of a learning data set of the detection model. Furthermore, the position score unit scores the position score for the candidate points on the basis of the position feature and the position feature distribution corresponding to the position feature. Furthermore, the structure score unit scores the structural score for the candidate point combination on the basis of the structural feature and the structural feature distribution corresponding to the structural feature.

The medical image processing apparatus according to an embodiment further includes a feature distribution calculation unit that calculates a combined position feature distribution indicating a probability distribution of a combined position feature in which a plurality of spatial position relationships are combined as the position feature and a combined structural feature distribution indicating a probability distribution of a combined structural feature in which a plurality of spatial structural relationships are combined as the structural feature, on the basis of a learning data set of the detection model. Furthermore, the position score unit scores the position score for the candidate points on the basis of the combined position feature and the combined position feature distribution corresponding to the combined position feature. Furthermore, the structure score unit scores the structural score for the candidate point combination on the basis of the combined structural feature and the combined structural feature distribution corresponding to the combined structural feature.

With this, a position feature and a structural feature can be calculated on the basis of a position feature distribution and a structural feature distribution, or a combined position feature distribution and a combined structure featural distribution, and a candidate point can be more accurately selected as a feature point, so that it is possible to further improve the detection rate of a plurality of feature points in a medical image.

The medical image processing apparatus according to an embodiment further includes a classifier learning unit that learns a position feature classifier on the basis of the position feature and a spatial position relationship between an abnormal point and the reference point in the medical image and learns a structural feature classifier on the basis of the structural feature, a spatial structural relationship between a plurality of abnormal points in the medical image, and a spatial structural relationship between the target points and the abnormal points in the medical image. Furthermore, the position score unit scores the position score for the candidate points on the basis of the position feature classifier. Furthermore, the structure score unit scores the structural score for the candidate point combination on the basis of the structural feature classifier.

With this, a position score and a structural score are scored for a plurality of candidate points for a target point on the basis of a position feature classifier and a structural feature classifier, so that it is possible to further improve the detection rate of a plurality of feature points in a medical image. Particularly, even in a medical image where it is difficult to construct a feature distribution of target points, a candidate point is accurately selected as a feature point by the position feature classifier and the structural feature classifier, so that it is possible to accurately detect a plurality of feature points in the medical image.

In accordance with the medical image processing apparatus according to an embodiment, the candidate point generation unit further generates a visual feature of each of the candidate points for each of the target points by using the detection model. Furthermore, the position score unit scores an individual total score as the position score for the candidate points on the basis of the position feature and the visual feature. Furthermore, the structure score unit scores a combined total score as the structural score for the candidate point combination on the basis of the structural feature and the individual total score.

With this, a plurality of candidate points for a target point are comprehensively evaluated on the basis of a visual feature, a position feature, and a structural feature, so that it is possible to further improve the detection rate of a plurality of feature points in a medical image. Particularly, even when the position score of an interfering point in a medical image of a subject is higher than that of the target point due to the cause such as surgery, a candidate point can be accurately selected as a feature point by using a total score based on the visual feature, so that it is possible to accurately detect a plurality of feature points in the medical image.

The medical image processing apparatus according to an embodiment further includes an updating unit that updates the position feature distribution and the structural feature distribution by online learning on the basis of the position score and the structural score.

The medical image processing apparatus according to an embodiment further includes an updating unit that updates position feature classifier and the structural feature classifier by online learning on the basis of the position score and the structural score.

With this, a detection model is learned online and is updated by using the updating unit, so that it is possible to obtain a position score and a structural score that are more adaptive to a current data set and to further improve the detection rate of a plurality of feature points in a medical image.

A medical image processing method according to an embodiment is a medical image processing method that detects a plurality of feature points in a medical image, and includes a reference point detection step, a candidate point generation step, a position score step, a structure score step, and an output step. In the reference point detection step, a reference point having a spatial correlation with the target point in the medical image is detected for each of a plurality of target points corresponding to the feature points. In the candidate point generation step, a plurality of candidate points corresponding to the target point are generated for each of the target points by using a detection model. In the position score step, for each of the target points, a position score is scored for the candidate points on the basis of a position feature indicating a spatial position relationship between the target point and the reference point in the medical image, and a candidate point having the position score satisfying a preset condition is selected. In the structure score step, for each of a plurality of candidate point combinations obtained by combining the candidate points among the target points, a structural score is scored for the candidate point combination on the basis of a structural feature indicating a spatial structural relationship between the target points in the medical image, and a candidate point combination having the structural score satisfying a preset condition is selected. In the output step, the feature points are output on the basis of the candidate point selected in the position score step and the candidate point combination selected in the structure score step.

In accordance with the medical image processing method according to an embodiment, in the position score step, a plurality of candidate points having the position score satisfying the condition are selected from the candidate points generated in the candidate point generation step. Furthermore, in the structure score step, a candidate point combination having the structural score satisfying the condition is selected from the candidate points selected in the position score step. Furthermore, in the output step, a plurality of candidate points included in the candidate point combination selected in the structure score step are output as the feature points.

In accordance with the medical image processing method according to an embodiment, in the structure score step, a candidate point combination having the structural score satisfying the condition is selected from the candidate points generated in the candidate point generation step. Furthermore, in the position score step, a plurality of candidate points having the position score satisfying the condition are selected from a plurality of candidate points included in the candidate point combination selected in the structure score step. Furthermore, in the output step, the candidate points selected in the position score step are output as the feature points.

The medical image processing method according to an embodiment further includes a feature distribution calculation step of calculating a position feature distribution indicating a probability distribution of the position feature and a structural feature distribution indicating a probability distribution of the structural feature, on the basis of a learning data set of the detection model. In the position score step, the position score is scored for the candidate points on the basis of the position feature and the position feature distribution corresponding to the position feature. In the structure score step, the structural score is scored for the candidate point combination on the basis of the structural feature and the structural feature distribution corresponding to the structural feature.

With this, a position score and a structural score can be scored for a plurality of candidate points for a target point on the basis of a position feature and a structural feature, and a candidate point having a position score and a structural score satisfying a condition can be accurately selected as a feature point, so that it is possible to accurately detect a plurality of feature points in a medical image.

In accordance with the medical image processing apparatus and the medical image processing method according to the present embodiment, a position score and a structural score are scored for a plurality of candidate points for a target point on the basis of a position feature distribution and a structural feature distribution, and a candidate point having a position score and a structural score satisfying a predetermined condition is selected as a feature point, so that it is possible to accurately detect a plurality of feature points in a medical image. Particularly, a structural score is scored for a candidate point combination including a plurality of candidate points on the basis of a structural feature and a candidate point in a candidate point combination having a structural score satisfying the predetermined condition is selected as a feature point, so that it is possible to accurately detect a plurality of feature points in a medical image at the same time.

Furthermore, in accordance with the medical image processing apparatus and the medical image processing method according to the present embodiment, a position score and a structural score are scored for a plurality of candidate points for a target point on the basis of a position feature classifier and a structural feature classifier, so that it is possible to further improve the detection rate of a plurality of feature points in a medical image. Particularly, even in a medical image where it is difficult to construct a feature distribution of target points, a candidate point is accurately selected as a feature point by the position feature classifier and the structural feature classifier, so that it is possible to accurately detect a plurality of feature points in the medical image.

Furthermore, in accordance with the medical image processing apparatus and the medical image processing method according to the present embodiment, a plurality of candidate points for a target point are comprehensively evaluated on the basis of a visual feature, a position feature, and a structural feature, so that it is possible to further improve the detection rate of a plurality of feature points in a medical image. Particularly, even when the position score of an interfering point in a medical image of a subject is higher than that of the target point due to the cause such as surgery, a candidate point can be accurately selected as a feature point by using a total score based on the visual feature, so that it is possible to accurately detect a plurality of feature points in the medical image.

In the medical image processing apparatus and the medical image processing method according to the present embodiment, a "feature point" is a numeric or encoded point having fixed, essential, and important feature attributes in a medical image. Furthermore, a "target point" is a point that is detected for a certain feature point as a result of detection by the medical image processing apparatus and the medical image processing method according to the present embodiment. The target point corresponds to the feature point. Furthermore, a "candidate point" is a point that is generated as a result of prediction by a detection model 1 to be described below, with respect to a certain target point. One or more candidate points can be generated for one target point, and by evaluating a plurality of candidate points on the basis of a position score and a structural score to be described below, one candidate point can be selected as a target point from the candidate points. A "reference point" is a point having a fixed location, salient features, and a spatial correlation with the target point. The reference point is for generating a plurality of candidate points of a target point as output data in the detection model 1 to be described below. There may be one or more reference points. For example, in the abdomen, the reference point may be the vertebrae or an upper part of the liver, and in the pelvis, the reference point may be the femur or the pubis. The reference point is not limited thereto, and may be any point having a fixed location, salient features, and a spatial correlation with the target point.

In the medical image processing apparatus and the medical image processing method according to the present embodiment, the detection model 1 of a target point is acquired on the basis of machine learning, and a plurality of candidate points of the target point are generated. Specifically, in the learning stage of the detection model 1, for each target point, a reference point and a target point are set in a medical image as a learning data set 2, and the detection model 1 corresponding to the target point is allowed to learn visual features associated with the target point, so that the detection model 1 is learned. Moreover, in a prediction stage, a plurality of candidate points for the target point are generated by using the learned detection model 1 to detect a target point on the basis of a medical image input as input data. Furthermore, in the medical image processing apparatus and the medical image processing method according to the present embodiment, a reference point in a medical image input as input data may be automatically detected or may be specified manually, and it is sufficient if there is a correlation between a structural position specified as a reference point and a target point by an automatic or manual method.

First Embodiment

Hereinafter, a medical image processing apparatus and a medical image processing method according to a first embodiment are described on the basis of FIG. 1 to FIG. 7.

First, the functional configuration of the medical image processing apparatus according to the first embodiment is described on the basis of FIG. 1. FIG. 1 is a block diagram illustrating the functional configuration of a medical image processing apparatus according to a first embodiment.

As illustrated in FIG. 1, the medical image processing apparatus according to the first embodiment includes a detection model 1, a reference point detection unit 10, a candidate point generation unit 20, a position score unit 30, a structure score unit 40, a feature distribution calculation unit 50, and an output unit 60. The medical image processing apparatus according to the first embodiment may further include an updating unit (details are described below) (not illustrated).

The medical image processing apparatus learns the detection model 1 by setting target points and reference points on a medical image as the learning data set 2, and generates a plurality of candidate points as output data for the medical image input as input data, by using the learned detection model 1.

The feature distribution calculation unit 50 calculates a position feature distribution on the basis of a plurality of spatial position relationships between the target points and the reference points in the learning data set 2, and calculates a structural feature distribution on the basis of spatial structural relationships between the target points in the learning data set 2.

The reference point detection unit 10 detects a reference point corresponding to the target point.

The candidate point generation unit 20 generates a plurality of candidate points for a specified target point on the basis of the learned detection model 1.

The position score unit 30 scores a position score for each of the candidate points on the basis of the position feature distribution and selects a plurality of candidate points satisfying a preset condition.

The structure score unit 40 scores a structural score for each of a plurality of candidate point combinations on the basis of the structural feature distribution, and selects a candidate point combination satisfying a preset condition.

The output unit 60 outputs the selected candidate points as a plurality of feature points in the medical image.

Then, the medical image processing apparatus performs various types of image processing, such as positioning, segmentation, and quantitative analysis, on the medical image on the basis of the feature points output by the output unit 60.

Figure 2:
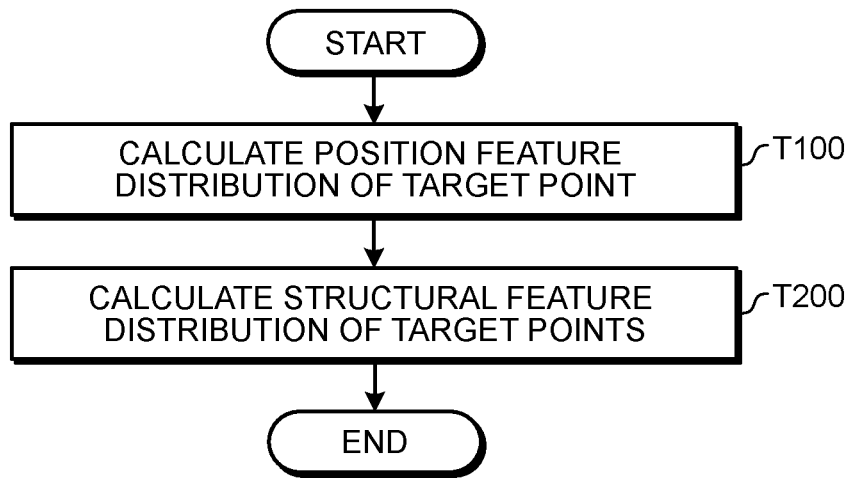
FIG. 2 is a flowchart illustrating the steps of a feature distribution calculation stage according to the first embodiment.
Figure 3:
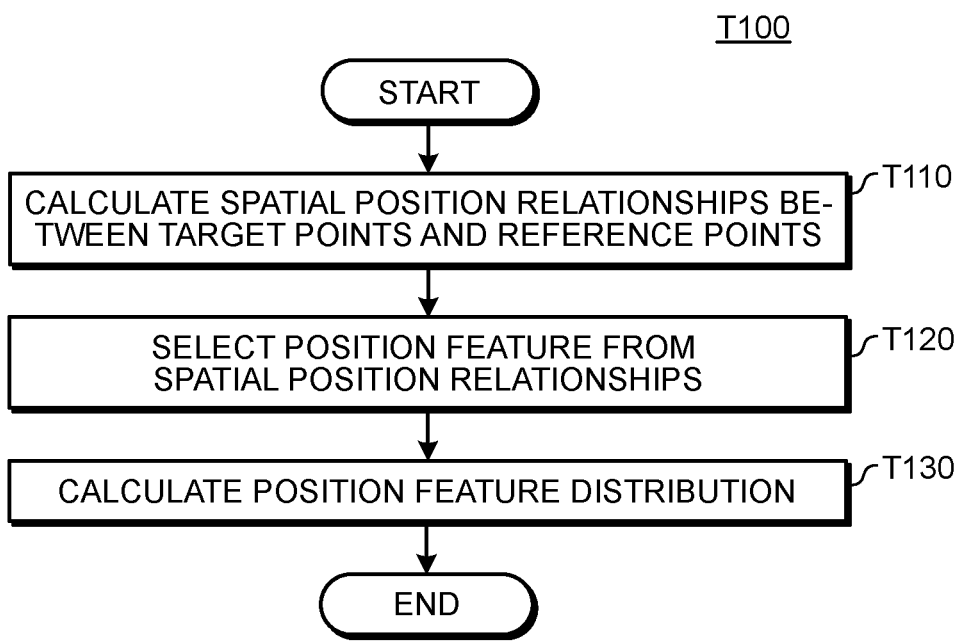
FIG. 3 is a flowchart illustrating the calculation of a position feature distribution according to the first embodiment.
Figure 4:
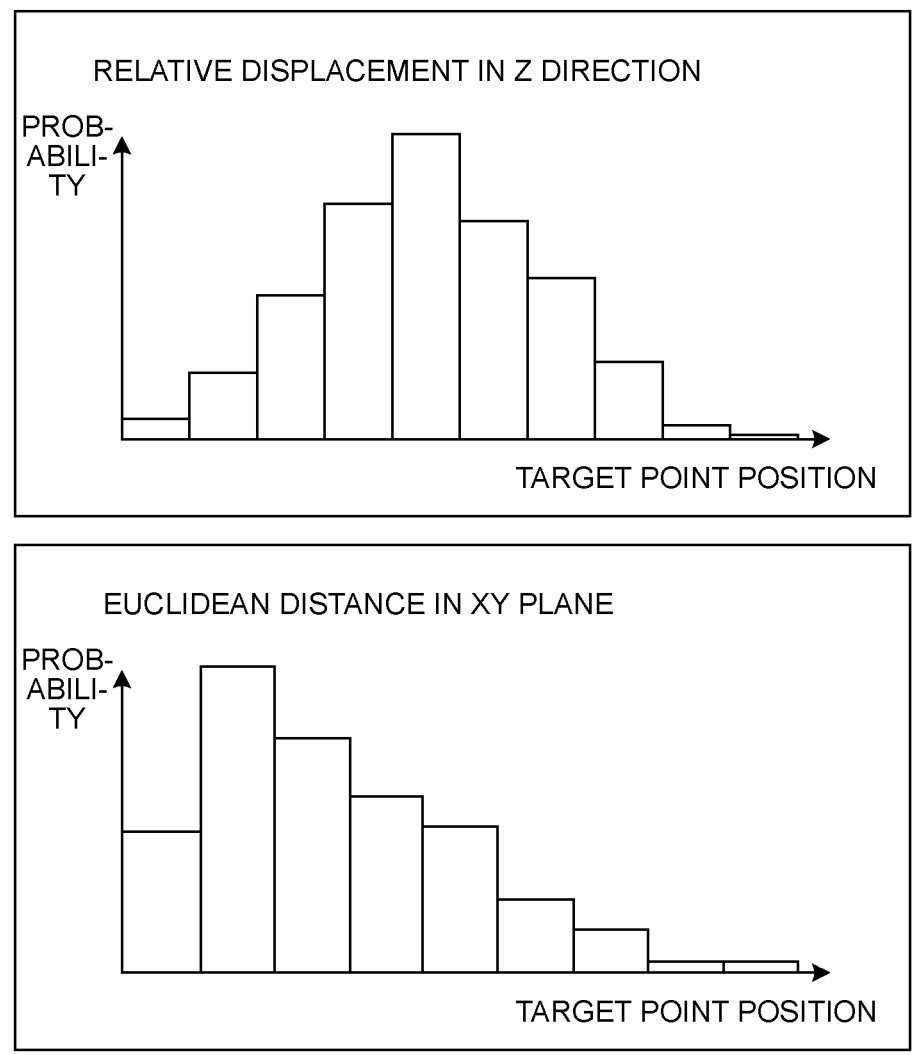
FIG. 4 is a schematic diagram illustrating an example of a spatial position relationship that follows a specific distribution according to the first embodiment.
Figure 5:
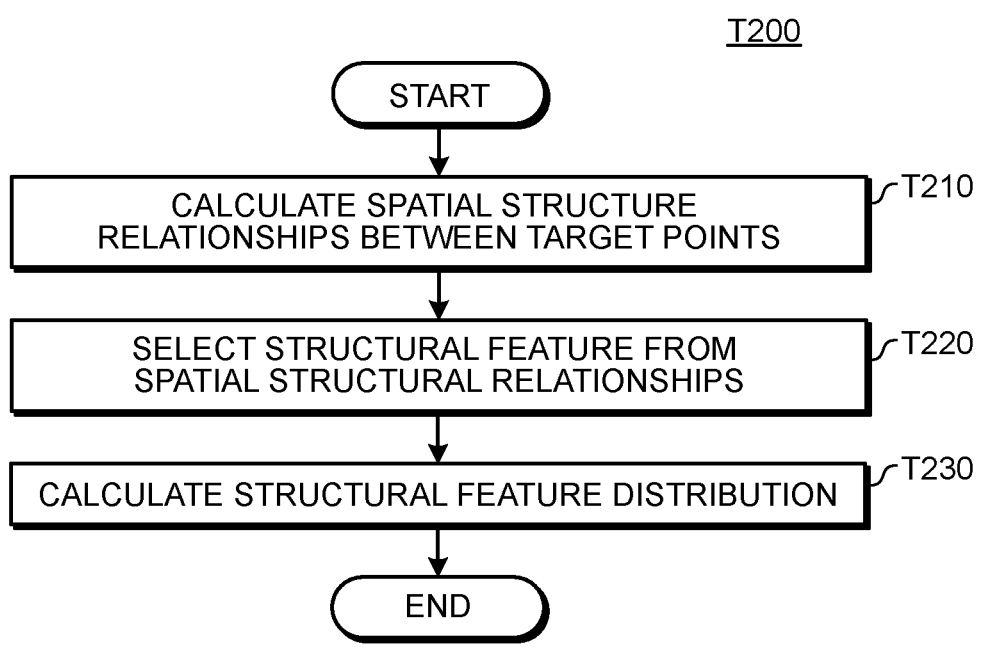
FIG. 5 is a flowchart illustrating the calculation of a structural feature distribution according to the first embodiment.

Next, a feature distribution calculation stage according to the first embodiment is described on the basis of FIG. 2 to FIG. 5. FIG. 2 is a flowchart illustrating steps T100 and T200 of the feature distribution calculation stage according to the first embodiment. FIG. 3 is a flowchart illustrating the calculation of a position feature distribution according to the first embodiment. FIG. 4 is a schematic diagram illustrating an example of a spatial position relationship that follows a specific distribution according to the first embodiment. FIG. 5 is a flowchart illustrating the calculation of a structural feature distribution according to the first embodiment.

As illustrated in FIG. 2, at step T100, the position feature distribution of the target points is calculated.

Specifically, as illustrated in FIG. 3, at step T110, the spatial positions between the target points and the reference points in the learning data set 2 are calculated. Specifically, the feature distribution calculation unit 50 calculates the spatial position relationships between the reference point and the target points set in the learning data set 2. Subsequently, the procedure proceeds to step T120.

At step T120, position features are selected from the spatial positional relationships between the target points and the reference points in the learning data set 2. Specifically, the feature distribution calculation unit 50 selects, from the spatial position relationships between the target points and the reference points in the learning data set 2 calculated at step T110, a spatial position relationship that follows the specific distribution as position features of the target points. The following is an example of a case where the spatial position relationship follows a normal distribution.

In a medical image, a certain spatial position relationship exists between target points and reference points due to the anatomy of a subject. For example, a space in a medical image is a three-dimensional space of XYZ, and X, Y, and Z axes are orthogonal to each other. The position features of the target point are spatial position relationships between the target points and the reference points, and include relative displacements between the target points and the reference point in X, Y, and Z directions, Euclidean distances between the target points and the reference points in XY, XZ, and YZ planes, angles between the target points and the reference points in the XY, XZ, and YZ planes, Euclidean distances between the target points and the reference points in the three-dimensional space of XYZ, and the results of normalizing these position features. The normalization is, for example, normalizing the relative displacements between the target points and the reference points in the x, y, and z directions with respect to the size of a subject region.

FIG. 4 is used as an example to describe the selection of the spatial position relationship that follows the specific distribution as the position feature. The upper figure of FIG. 4 is a diagram illustrating the spatial position relationship of the relative displacements in the Z direction between the target points and the reference points in the learning data set 2, and the lower figure of FIG. 4 is a diagram illustrating the spatial position relationship of the Euclidean distances in the XY plane between the target points and the reference points in the learning data set 2.

As illustrated in the upper figure of FIG. 4, the spatial position relationship of the relative displacements in the Z direction between the target points and the reference points in the learning data set 2 follows a normal distribution (kurtosis and skewness both approach 0). On the other hand, as illustrated in the lower figure of FIG. 4, the spatial position relationship of the Euclidean distances in the XY plane between the target points and the reference points in the learning data set 2 does not follow the normal distribution. Therefore, the feature distribution calculation unit 50 selects the spatial position relationship of the relative displacements in the Z direction between the target points and the reference points in the learning data set 2 as the position feature. One or more position features may be selected. For example, when there are a plurality of spatial position relationships that follow the specific distribution, the feature distribution calculation unit 50 may select the spatial position relationships that follow the specific distribution as position features, respectively. Subsequently, the procedure proceeds to step T130.

At step T130, the position feature distribution is calculated. Specifically, the feature distribution calculation unit 50 calculates a probability density function of the distribution followed by the position features selected at step T120, as the position feature distribution of the position features. For example, the feature distribution calculation unit 50 estimates a mean value μ and a variance $\sigma^2$ of the position features selected at step T120 with respect to the target points and the reference points in the learning data set 2 by using maximum likelihood estimation, and calculates a probability density function f(x) corresponding to the position features as the position feature distribution by the following equation (1).

$$f(x) = \frac{1}{\sqrt{2\pi}\sigma} \exp\left(-\frac{(x-\mu)^2}{2\sigma^2}\right) \quad (1)$$

FIG. 12 is described an example. FIG. 12 is a schematic diagram illustrating an example of the position feature distribution according to the first embodiment.

In FIGS. 12, $R_1$ and $R_2$ indicate reference points $R_1(x_1, y_1, z_1)$ and $R_2(x_3, y_2, z_2)$ specified in the learning data set 2, and A indicates a target point $A(x_A, y_A, z_A)$ specified in the learning data set 2. Three spatial position relationships $F_1$, $F_2$, and $F_3$ are included between the target point A and the reference points $R_1$ and $R_2$. $F_1$ indicates a relative displacement in the Z direction between the target point A and the reference point $R_1$, $F_2$ indicates an angle in the XY plane between the target point A and the reference point $R_2$, and $F_3$ indicates a Euclidean distance in the XY plane between the target point A and the reference point $R_2$. Furthermore, $f_1(x)$, $f_2(x)$, and $f_3(x)$ indicate probability density functions of the distribution followed by the spatial position relationships $F_1$, $F_2$, and $F_3$, respectively. Since the spatial position relationship $F_1$ follows a normal distribution of $F_1$ to $N(\mu_1, \sigma_1^2)$, the feature distribution calculation unit 50 selects the spatial position relationship $F_1$ as the position feature $F_1$ of the target point A and calculates the probability density function $f_1(x)$ of the position feature $F_1$ as a position feature distribution. Similarly, the feature distribution calculation unit 50 determines whether the spatial position relationships $F_2$ and $F_3$ follow the specific distribution, and when the spatial position relationships $F_2$ and $F_3$ follow the specific distribution, the feature distribution calculation unit 50 selects the spatial position relationships $F_2$ and $F_3$ as position features $F_2$ and $F_3$ of the target point A and calculates the probability density functions $f_2(x)$ and $f_3(x)$ as position feature distributions. The position feature distribution indicates the probability that the target point A determined on the basis of the position features $F_1$, $F_2$, and $F_3$ appears at different positions in the learning data set 2.

In this way, at steps T110, T120, and T130, on the basis of the learning data set 2 of the detection model 1, the feature distribution calculation unit 50 selects, as position features, spatial position relationships between the target points and the reference points that follow the specific distribution in the learning data set 2, and calculates probability density functions indicating the distribution of the position features as position feature distributions.

Although the example in which the spatial position relationship follows the normal distribution has been described, a spatial position relationship that follows other types of distributions may be selected as a position feature and a probability density function of the distribution may be calculated. It is sufficient if the spatial position relationship between the target points and the reference points in the learning data set 2 follows the specific distribution, and the distribution can be indicated by a probability density function.

By combining a plurality of spatial position relationships as position features, a combined position feature may be constructed for the spatial position relationships, and a probability density function of the combined position feature may be calculated as a combined position feature distribution.

Returning now back to FIG. 2, at step T200, a structural feature distribution of the target points is calculated.

The relative positions between the feature points can reflect a spatial structural relationship between the feature points. For example, relative positions between the feature points in the same organ can reflect the overall structure of the organ, such as geometry and morphology within the body. Furthermore, the relative position relationship between a plurality of feature points in different organs can reflect the local anatomical structure of the body of a subject.

From the above, on the basis of the learning data set 2 of the detection model 1, the feature distribution calculation unit 50 selects, as structural features, spatial structural relationships between the target points, which follow the specific distribution, in the learning data set 2, and calculates a probability density function indicating the distribution of the structural features as a structural feature distribution.

More specifically, as illustrated in FIG. 5, first, at step T210, a plurality of spatial structural relationships between the target points in the learning data set 2 are calculated. Specifically, the feature distribution calculation unit 50 calculates the spatial structural relationships between the target points in the learning data set 2. The spatial structural relationships between the target points are similar to the spatial position relationships between the target points and the reference points at step T110 and indicate the positional relationships between the target points. Subsequently, the procedure proceeds to step T220.

At step T220, structural features are selected from the spatial structural relationships between the target points in the learning data set 2. Specifically, the feature distribution calculation unit 50 selects, as the structural features, the spatial structural relationship that follows the specific distribution from the spatial structural relationships between the target points in the learning data set 2 calculated at step T210. The spatial structural relationship that follows the specific distribution is similar to that at step T120. Subsequently, the procedure proceeds to step T230.

At step T230, the structural feature distribution is calculated. Specifically, the feature distribution calculation unit 50 calculates a probability density function of the distribution followed by the structural features selected at step T220 as the structural feature distribution of the structural features.

Hereinafter, step T210, step T220, and step T230 are described using a case where three target points A, B, and C are included in the learning data set 2 as an example. In this case, at step T210, the feature distribution calculation unit 50 combines the target points A, B, and C, and calculates, for each two target points included in the combinations, a plurality of positional relationships between the two target points as a plurality of spatial structural relationships. Moreover, the feature distribution calculation unit 50 selects, as a structural feature, a spatial structural relationship that follows a specific distribution from the calculated spatial structural relationships. For example, the feature distribution calculation unit 50 selects structural features $F_4$, $F_5$, and $F_6$. Then, the feature distribution calculation unit 50 calculates probability density functions $f_4(x)$, $f_5(x)$, and $f_6(x)$ corresponding to the structural features $F_4$, $F_5$, and $F_6$ as structural feature distributions. The structural feature distributions $f_4(x)$, $f_5(x)$, and $f_6(x)$ indicate the probability that different structures including a plurality of combinations of the target points A, B, and C appear at different locations in the learning data set 2, the structures being determined on the basis of the structural features $F_4$, $F_5$, and $F_6$.

By combining a plurality of spatial structural relationships as structural features, a combined structural feature may be constructed for the spatial structural relationships, and a probability density function of the combined structural feature may be calculated as a combined structural feature distribution.

In this way, at steps T100 and T200 which belong to the feature distribution calculation stage, the feature distribution calculation unit 50 selects position features and structural features on the basis of the target points and the reference points in the learning data set 2 of the detection model 1, and calculates a position feature distribution and a structural feature distribution corresponding to the position features and the structural features, respectively.

Figure 6:
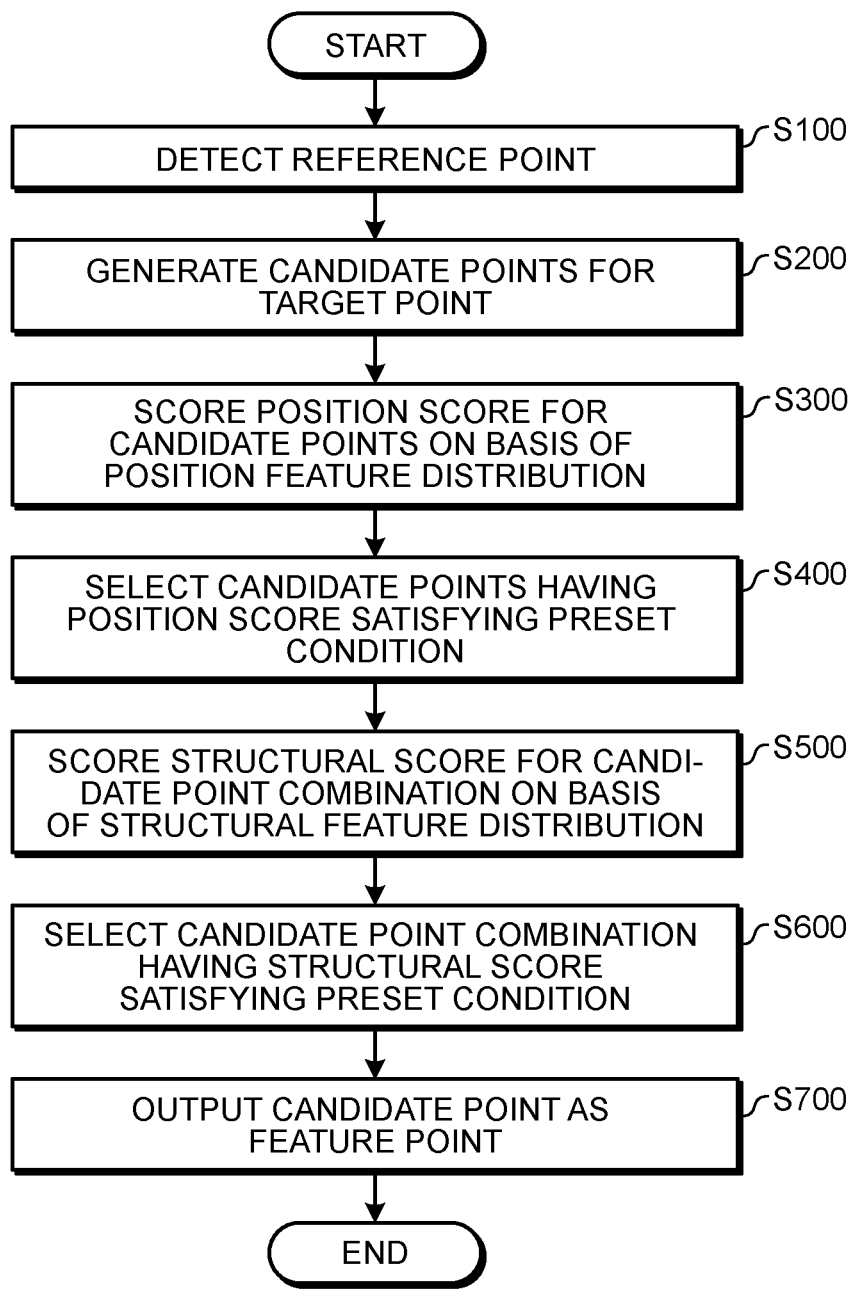
FIG. 6 is a flowchart illustrating the steps of a detection stage according to the first embodiment.
Figure 7:
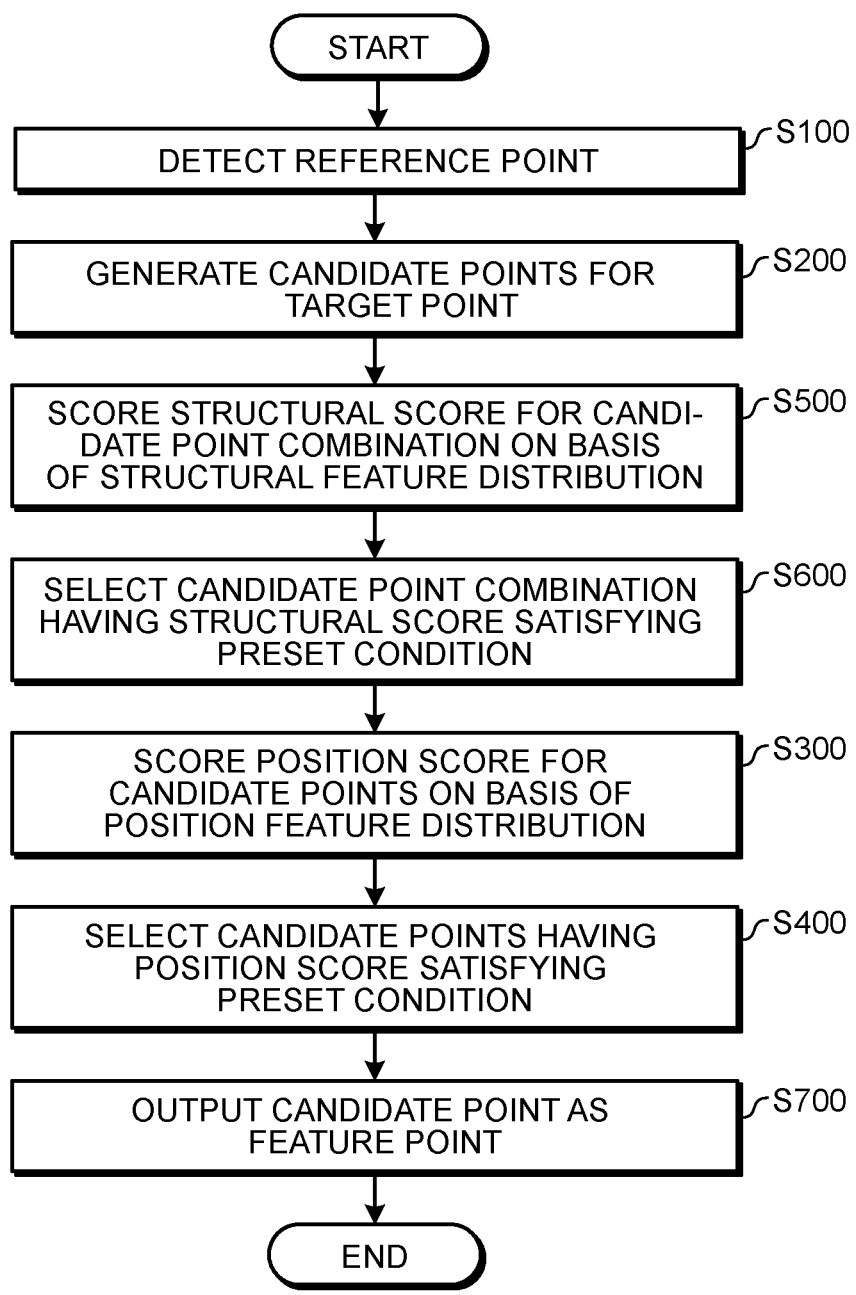
FIG. 7 is a flowchart illustrating the steps of a detection stage according to the first embodiment.

Next, a detection stage according to the first embodiment is described on the basis of FIG. 6 to FIG. 7. FIG. 6 and FIG. 7 are flowcharts illustrating steps S100, S200, S300, S400, S500, and S600 of the detection stage according to the first embodiment.

As illustrated in FIG. 6, reference points are detected at step S100.

Specifically, for each of a plurality of target points corresponding to a plurality of feature points, the reference point detection unit 10 detects a reference point having a spatial correlation with the target points in a medical image input as input data. The reference point detection unit 10 may detect the reference point in the medical image on the basis of the detection model 1, or may detect or specify the reference point on the basis of other automatic or manual methods. One or more reference points may be detected. Furthermore, it is sufficient if one or more reference points that are detected or specified show a correlation with the target points. Subsequently, the procedure proceeds to step S200.

At step S200, a plurality of candidate points for the target points are generated.

Specifically, the candidate point generation unit 20 uses the detection model 1 and generates the candidate points corresponding to the target points with respect to each of the target points. The learned detection model 1 generates, for a specified target point, a plurality of candidate points that most closely match the visual features of the targets point in the medical image input as the input data, and outputs the generated candidate points to the position score unit 30. The medical image processing apparatus and the medical image processing method according to the present embodiment simultaneously detect a plurality of feature points, that is, a plurality of target points. Therefore, at step S200, the candidate point generation unit 20 generates the candidate points for each of the target points. That is, each of the target points corresponds to the candidate points. Subsequently, the procedure proceeds to step S300.

At step S300, a position score is scored for the candidate points on the basis of the position feature distribution.

Specifically, the position score unit 30 scores, for each of the target points, the position score for the candidate points generated by the candidate point generation unit 20 at step S200, on the basis of the selected position features and the calculated position feature distribution by the feature distribution calculation unit 50 at steps T110, T120, and T130 of calculating the position feature distribution.

Hereinafter, the scoring of the position score is described using the aforementioned target point A and position features $F_1$, $F_2$, and $F_3$ corresponding to the target point A as an example. For example, it is assumed that at step S200, the candidate point generation unit 20 has generated three candidate points $D_{A1}$, $D_{A2}$, and $D_{A3}$ with respect to the target point A. In that case, the position score unit 30 calculates the position features $F_1$, $F_2$, and $F_3$ corresponding to the target point A with respect to the candidate point $D_{A1}(x_{DA1}, y_{DA1}, z_{DA1})$. First, the position score unit 30 calculates a relative displacement $d_{zF1} = z_{D1} - z_1$ in the z direction between the candidate point $D_{A1}(x_{DA1}, y_{DA1}, z_{DA1})$ and a reference point $R_1(x_1, y_1, z_1)$ on the basis of the position feature $F_1$. Since the position feature $F_1$ follows the normal distribution of $F_1$ to $N(\mu_1, \sigma_1^2)$, the position score unit 30 uses the position feature distribution corresponding to the position feature $F_1$, that is, the probability density function $f_1(x)$ and calculates a position score $S_{DA1\_F1}$ of the candidate point $D_{A1}$ by the following equation (2):

$$S_{DA1\_F1} = \frac{f_1(dz_1)}{f_1(\mu_1)} \qquad (2)$$

where, $f_1(d_{z1})$ indicates a probability density at the candidate point $D_{A1}$ in the position feature distribution, and $f_1(\mu_1)$ indicates a probability density at the mean value of the learning data set 2 in the position feature distribution. That is, the position score $S_{DA1\_F1}$ reflects the distance between the candidate point $D_{A1}$ for the target point A and the mean value of the target point A in the learning data set 2 on the curve of the probability density function $f_1(x)$ on the basis of the position feature $F_1$. The position score $S_{DA1\_F1}$ is a value greater than 0 and equal to or less than 1, and the higher the position score $S_{DA1\_F1}$ (closer to 1), the shorter the distance between the candidate point $D_{A1}$ for the target point A and the mean value of the target point A in the learning data set 2 on the basis of the position feature $F_1$.

Moreover, similarly to the above, on the basis of the position features $F_2$ and $F_3$ corresponding to the target point A, the position score unit 30 scores position scores based on the position features $F_2$ and $F_3$ with respect to the candidate point $D_{A1}$, and calculates position scores $S_{DA1\_F2}$ and $S_{DA1\_F3}$. Moreover, the position score unit 30 calculates the total position score $S_{DA1}$ of the candidate point $D_{A1}$ by the following equation (3):

$$S_{DA1} = \lambda_1 S_{DA1\_F1} + \lambda_2 S_{DA\_F2} + \lambda_3 S_{DA1\_F3} \qquad (3)$$

where, $\lambda$ indicates a weight coefficient. The position score unit 30 calculates the total position score $S_{DA1}$ for the candidate point $D_{A1}$ by assigning different weight coefficients $\lambda_1$, $\lambda_2$, and $\lambda_3$ to the position scores $S_{DA1\_F1}$ and $S_{DA1\_F2}$ based on the position features $F_1$, $F_2$, and $F_3$, respectively, and adding the position scores weighted by the weight coefficients. For example, the position score unit 30 assigns a higher weight coefficient to a position feature with higher reliability. The high reliability means, for example, that the position feature follows a Gaussian distribution or a standard deviation is small.

A higher total position score $S_{DA1}$ for the candidate point $D_{A1}$ indicates that the candidate point $D_{A1}$ generated by the candidate point generation unit 20 at step S200 is more likely to be the target point A. In a similar manner, the position score unit 30 scores position scores for the candidate points $D_{A2}$ and $D_{A3}$, respectively.

In the above description, for candidate points, a position score is scored for the candidate points by using, as the position score, the ratio of a probability density at the candidate points in the position feature distribution to a probability density at the mean value of the learning data set 2 in the position feature distribution, but the position score may be scored by other methods. It is sufficient if the position score indicates the possibility that the candidate point is a target point on the basis of the position feature distribution. For example, the position score is an index value indicating the degree of coincidence between the candidate point and the target point, or the certainty that the candidate point is the target point.

In this way, the position score unit 30 scores position scores for the candidate points on the basis of the position feature distribution. Subsequently, the procedure proceeds to step S400.

At step S400, candidate points having a position score satisfying a preset condition are selected.

Specifically, for each of the target points, on the basis of the preset threshold, the position score unit 30 selects candidate points having a position score exceeding the threshold from the candidate points generated by the candidate point generation unit 20 at step S200, and outputs the selected candidate points to the structure score unit 40.

At step S400, the preset condition is that the position score for the candidate point exceeds the preset threshold, but is not limited thereto and the position score unit 30 may select several candidate points in descending order of the position score from all the candidate points, and output the selected candidate points to the structure score unit 40. Furthermore, the position score unit 30 may select candidate points on the basis of the position score by using other criteria as preset conditions, and it is sufficient if the criteria are capable of selecting a candidate point that is likely to be a target point. Subsequently, the procedure proceeds to step S500.

At step S500, a structural score is scored for a candidate point combination on the basis of the structural feature distribution.

Specifically, for each of a plurality of candidate point combinations obtained by combining the candidate points selected by the position score unit 30 at step S400 with respect to the target points, the structure score unit 40 scores a structural score for the candidate point combination on the basis of the selected structural features and the calculated structural feature distribution by the feature distribution calculation unit 50 at steps T210, T220, and T230 of calculating the structural feature distribution.

Hereinafter, the scoring of the structural score is described using, as an example, the aforementioned target points A, B, and C, candidate points $D_{A1}$, $D_{A2}$, and $D_{A3}$, $D_{B1}$, $D_{B2}$, and $D_{B3}$, and $D_{C1}$, $D_{C2}$, and $D_{C3}$ respectively corresponding to the target points A, B, and C, and the structural features $F_4$, $F_5$, and $F_6$ corresponding to the target points A, B, and C. For example, it is assumed that at step S400, the position score unit 30 has selected the candidate points $D_{A1}$ and $D_{A2}$ for the target point A, the candidate points $D_{B1}$ and $D_{B2}$ for the target point B, and the candidate points $D_{C1}$ and $D_{C2}$ for the target point C on the basis of the position score of each of the target points A, B, and C. The candidate point combination means that one combination includes one candidate point corresponding to each of the target points A, B, and C, that is, these candidate points can be combined into eight candidate point combinations: $(D_{A1}, D_{B1}, D_{C1})$ $(D_{A1}, D_{B1}, D_{C2})$, $(D_{A1}, D_{B2}, D_{C2})$, $(D_{A1}, D_{B2}, D_{C2})$, $(D_{A2}, D_{B1}, D_{C1})$, $(D_{A2}, D_{B1}, D_{C1})$, $(D_{A2}, D_{B2}, D_{C1})$, and $(D_{A2}, D_{B2}, D_{C2})$. In such a case, the structure score unit 40 calculates the structural features $F_4$, $F_5$, and $F_6$ for a certain candidate point combination n $(D_{An}, D_{Bn}, D_{Cn})$ $(n\in[1, 8])$. Subsequently, on the basis of the structural features $F_4$, $F_5$, and $F_6$, the structure score unit 40 calculates structural scores $S_{n\_F4}$, $S_{n\_F5}$, and $S_{n\_F6}$ for the candidate point combination n by using the structural feature distributions $f_4(x)$, $f_5(x)$, and $f_6(x)$ respectively corresponding to the structural features $F_4$, $F_5$, and $F_6$. Then, the structure score unit 40 assigns different weight coefficients to the structural scores based on each structural feature, and calculates the total structural score $S_n$ of the candidate point combination n by adding the structural scores weighted by the weight coefficients. Since the specific calculation method of the structural score is the same as that of step S300, description thereof is omitted.

The higher the total structural score $S_n$ of the candidate point combination n $(D_{An}, D_{Bn}, D_{Cn})$, the higher the possibility that the candidate points $D_{An}$, $D_{Bn}$, and $D_{Cn}$ in the candidate point combination are the target points A, B, and C. In a similar manner, the structure score unit 40 scores structural scores for the other candidate point combinations.

In this way, the structure score unit 40 scores structural scores for candidate point combinations on the basis of the structural feature distribution. Subsequently, the procedure proceeds to step S600.

At step S600, a candidate point combination having a structural score satisfying a preset condition is selected.

Specifically, on the basis of a preset threshold, the structure score unit 40 selects a candidate point included in a candidate point combination with the highest structural score and outputs the selected candidate point to the output unit 60.

For example, when the structural score of the candidate point combination $(D_{A2}, D_{B1}, D_{C2})$ is the highest score among the aforementioned eight candidate point combinations, the structure score unit 40 selects the candidate points $D_{A2}$, $D_{B1}$, and $D_{C2}$ included in the candidate point combination $(D_{A2}, D_{B1}, D_{C2})$.

At step S600, the predetermined condition is that the structural score of the candidate point combination is the highest, but is not limited thereto, and the structure score unit 40 may select candidate points included in some of the top candidate point combinations in descending order of the structural score among all the candidate point combinations. The structure score unit 40 may select candidate point combinations on the basis of the structural score by using other criteria as preset conditions, and it is sufficient if the criteria are capable of selecting candidate points that are likely to be target points. Subsequently, the procedure proceeds to step S700.

At step S700, the selected candidate points are output as feature points.

Specifically, the output unit 60 outputs, as feature points, the candidate points selected by the structure score unit 40 at step S600.

In the first embodiment, the order of scoring the position score and scoring the structural score may be interchanged. That is, as illustrated in FIG. 7, after the candidate point generation unit 20 outputs the generated candidate points to the structure score unit 40 at step S200, the structure score unit 40 performs step S500 to score a structural score for a plurality of candidate point combinations obtained by combining the candidate points generated by the candidate point generation unit 20, on the basis of the structural feature distribution. Subsequently, the structure score unit 40 performs step S600 to select candidate points included in a candidate point combination with a higher structural score from the candidate point combinations, and outputs the selected candidate points to the position score unit 30. Thereafter, the position score unit 30 performs step S300 to score a position score for the candidate points selected by the structure score unit 40, on the basis of the position feature distribution. Subsequently, the position score unit 30 performs step S400 to select candidate points having a high position score, and outputs the selected candidate points to the output unit 60. Then, the output unit 60 outputs the candidate points selected by the position score unit 30, as feature points.

Furthermore, as the number of target points increases, the number of candidate points increases, resulting in an increase in the number of candidate point combinations. In order to avoid a combinatorial explosion due to an increase in the number of such candidate point combinations, the structure score unit 40 may score a structural score hierarchically at step S500. Specifically, a plurality of target points may be divided into several subsets depending on an organ or a tissue to which the target points belong. For example, a first subset includes target points corresponding to feature points of the liver, a second subset includes target points corresponding to feature points of the kidney, a third subset includes target points corresponding to feature points of the pancreas, and in these subsets, candidate points corresponding to the target points are combined to calculate structural scores of the candidate points. In such a case, structural features indicate physiological structural features of organs or tissues. After scoring scores for candidate point combinations in different subsets and selecting candidate points, structural features between the organs or the tissues are calculated on the basis of physiological structural features between the organs or the tissues, the selected candidate points are combined to score a structural score, and candidate points are selected.

In accordance with the medical image processing apparatus and the medical image processing method according to the first embodiment described above, a position feature distribution can be calculated on the basis of the spatial position relationship between target points and reference points, and a structural feature distribution can be calculated on the basis of the spatial structural relationship between the target points. Moreover, on the basis of the position feature distribution and the structural feature distributions, a position score and a structural score are scored for a plurality of candidate points for a certain target point. Then, candidate points with high position and structural scores are selected as target points, and the target points are output as feature points. This enables accurate detection of a plurality of feature points in a medical image.

Furthermore, in accordance with the medical image processing apparatus and the medical image processing method according to the first embodiment, since a position score and a structural score are scored for a plurality of candidate points corresponding to any one target point on the basis of a position feature distribution and a structural feature distribution, even when there is similar interfering tissue that follows the same spatial position relationship in the vicinity of a target point, the position score and the structural score can be simultaneously scored to exclude an interfering tissue that satisfies only the spatial position relationship but does not satisfy a spatial structural relationship. This enables accurate detection of a plurality of feature points in a medical image.

Furthermore, in accordance with the medical image processing apparatus and the medical image processing method according to the first embodiment, since a position score and a structural score are independent of a detection process, only high detection accuracy is required for the detection model 1, and it is required that the position score and the structural score can accurately reflect the spatial relationship between target points and reference points or between the target points. Therefore, compared to the combined detection model of the related art that requires simultaneous consideration of the above factors, the medical image processing apparatus and the medical image processing method according to the present embodiment can obtain high detection accuracy for each target point and at the same time can accurately secure a spatial position relationship and a spatial structural relationship. From the above two viewpoints, it is possible to obtain a detection result with high detection accuracy and an accurate spatial relationship. This enables accurate detection of a plurality of feature points in a medical image.

Second Embodiment

Figure 8:
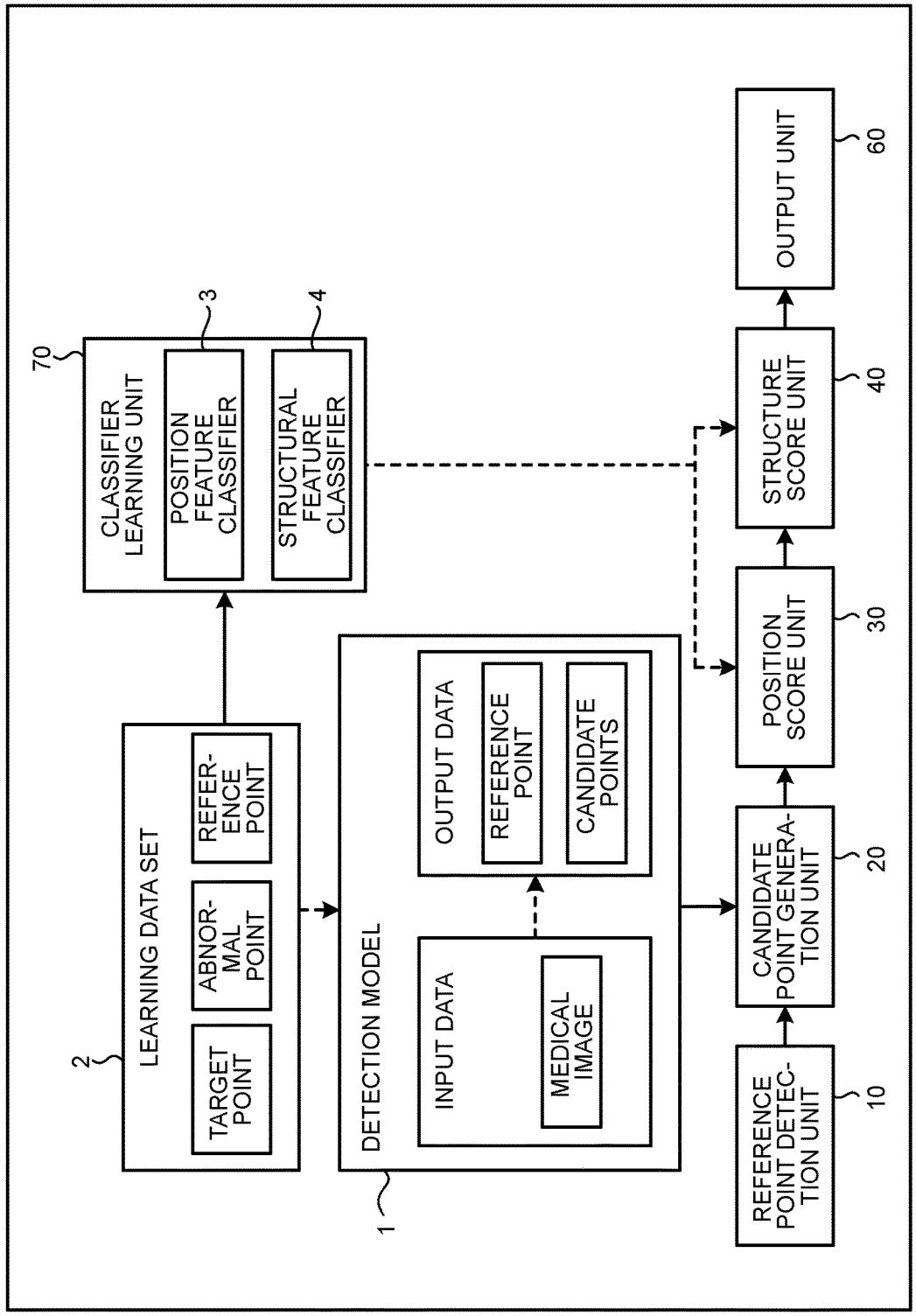
FIG. 8 is a block diagram illustrating a functional configuration of a medical image processing apparatus according to a second embodiment.
Figure 9:
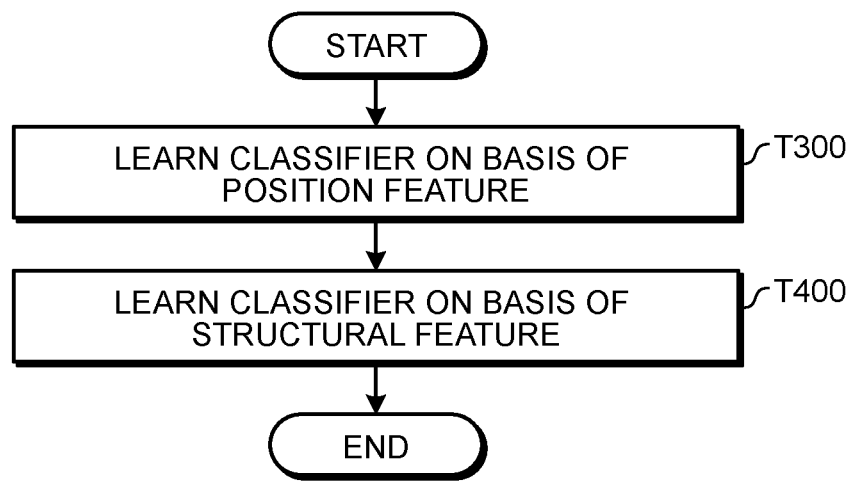
FIG. 9 is a flowchart illustrating the steps of a classifier learning stage according to the second embodiment.
Figure 10:
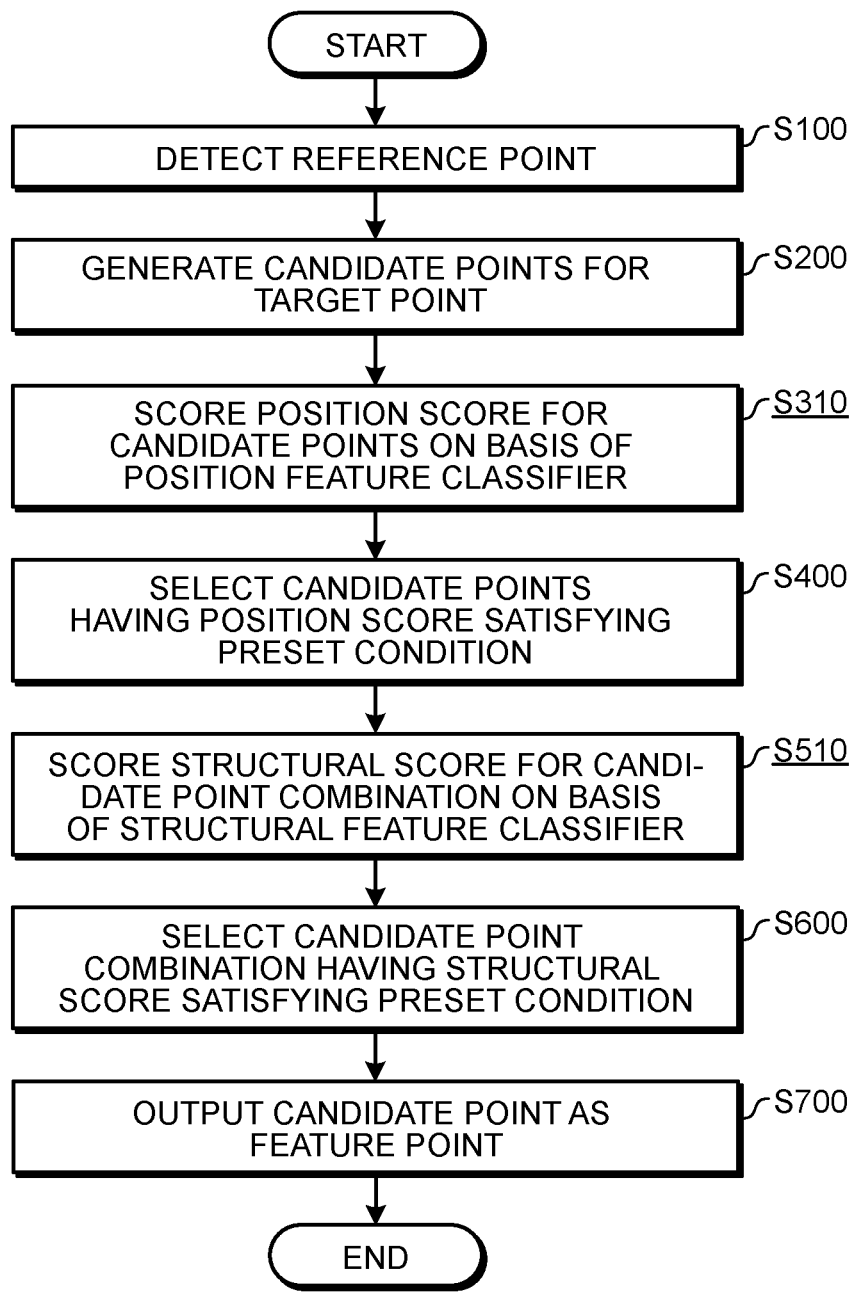
FIG. 10 is a flowchart illustrating the steps of a detection stage according to the second embodiment.

Next, a medical image processing apparatus and a medical image processing method according to a second embodiment are described on the basis of FIG. 8 to FIG. 10. In the following description, only the differences between the second embodiment and the first embodiment are described, and description of the same configurations is omitted.

The method of the first embodiment is divided into a feature distribution calculation stage and a detection stage, and in the feature distribution calculation stage, position features and structural features that follow a specific distribution are selected and probability distributions corresponding to the position features and the structural features are constructed to obtain a position feature distribution and a structural feature distribution, so that a position score and a structural score are scored for a plurality of candidate points. This method is also called a generative approach.

On the other hand, in the second embodiment, what is called a discriminative approach is adopted as the basis of a position score and a structural score for a plurality of candidate points. Specifically, a method of the second embodiment is divided into a classifier learning stage and a detection stage.

FIG. 8 is a block diagram illustrating a functional configuration of a medical image processing apparatus according to the second embodiment. FIG. 9 is a flowchart illustrating steps T300 and T400 of the classifier learning stage according to the second embodiment.

As illustrated in FIG. 8, the medical image processing apparatus according to the second embodiment includes the detection model 1, the reference point detection unit 10, the candidate point generation unit 20, the position score unit 30, the structure score unit 40, a classifier learning unit 70, and the output unit 60. The medical image processing apparatus according to the second embodiment may further include an updating unit (details are described below) (not illustrated).

As illustrated in FIG. 9, at step T300, a classifier is learned on the basis of position features.

Specifically, the classifier learning unit 70 sets target points, abnormal points, and reference points in a medical image as the learning data set 2. Then, the classifier learning unit 70 sets the target points as positive samples and sets the abnormal points as negative samples in the learning data set 2. The abnormal point is a point where a visual feature in the learning data set 2 is similar to the target point but is not regarded as the target point. Subsequently, the classifier learning unit 70 calculates a spatial position relationship between the target points and the reference points and a spatial position relationship between the abnormal points and the reference points in the learning data set 2, respectively, selects the spatial position relationship between the target points and the reference points as a position feature similarly to T100 described above, and learns a position feature classifier 3 by causing a classifier to learn the position feature and the spatial position relationship between the abnormal points and the reference points.

Subsequently, at step T400, the classifier is learned on the basis of a structural feature.

Specifically, the classifier learning unit 70 sets target points and abnormal points in the medical image as the learning data set 2. Then, the classifier learning unit 70 sets the target points as positive samples and sets the abnormal points as negative samples in the learning data set 2. Subsequently, the classifier learning unit 70 calculates a spatial structural relationship between the target points, a spatial structural relationship between the abnormal points, and a spatial structural relationship between the target points and the abnormal points in the learning data set 2, respectively, and, selects the spatial structural relationship between the target points as a structural feature similar to T200 described above, and learns a structural feature classifier 4 by causing the classifier to learn the structural feature, the spatial structural relationship between the abnormal points, and the spatial structural relationship between the target points and the abnormal points.

The position feature classifier 3 and the structural feature classifier 4 can predict a classification probability of candidate points in a medical image input as input data, on the basis of the target points and the abnormal points. The classification probability of the candidate points is a probability indicating whether the candidate point is the target point or the abnormal point.

Furthermore, for example, the classifier learning unit 70 may learn a plurality of weak classifiers with a small correlation and to make a combined prediction. The classifier learning unit 70 may select as many valid features as possible simultaneously and learn one strong classifier to make a prediction. The format and learning method of the classifier art not limited to the above, but it is sufficient if the classifier is learned on the basis of the spatial position relationship and the spatial structural relationship between the target points or the abnormal points and can score scores for candidate points for the target points.

Next, the detection stage according to the second embodiment is described on the basis of FIG. 10. FIG. 10 is a flowchart illustrating steps S100, S200, S310, S400, S510, S600, and S700 of the detection stage according to the second embodiment. In the second embodiment, only steps different from those in the first embodiment are described, and the same steps as those in the first embodiment are denoted by the same reference numerals in FIG. 10 and description thereof is omitted. The same steps are, for example, steps S100, S200, S400, S600, and S700.

At step S200, the candidate point generation unit 20 generates a plurality of candidate points for the target points. Subsequently, the procedure proceeds to step S310.

At step S310, the position score unit 30 scores a position score for the candidate points on the basis of the classification probability of the candidate point predicted by the position feature classifier 3. Subsequently, the procedure proceeds to step S400.

The classification probability of the candidate points indicates a classification probability that the candidate point is predicted by the position feature classifier 3, that is, the probability that the candidate point is the target point or the reference point. For example, the position score is a value greater than 0 and equal to or less than 1, the closer the position score is to 1, the higher the probability that the candidate point is the target point, and the closer the position score is to 0, the higher the probability that the candidate point is the abnormal point. The position score may be in other forms, and may be any form as long as it can indicate the classification probability of the target points or the abnormal points.

At step S400, the position score unit 30 selects candidate points having a position score satisfying a preset condition and outputs the selected candidate points to the structure score unit 40. Subsequently, the procedure proceeds to step S510.

At step S510, the structure score unit 40 scores a structural score for a plurality of candidate point combinations on the basis of the structural feature classifier 4. Subsequently, the procedure proceeds to step S600.

Since the step after step S600 is the same as that in the first embodiment, description thereof is omitted. This completes the flow of the second embodiment.

Also in the second embodiment, as in the first embodiment, the order of scoring the position score and scoring the structural score may be interchanged.

In accordance with the medical image processing apparatus and the medical image processing method according to the second embodiment described above, a position feature classifier is learned on the basis of a spatial position relationship between target points and reference points (that is, a position feature) and a spatial position relationship between abnormal points and the reference points, and a structural feature classifier is learned on the basis of a spatial position relationship between the target points (that is, a structural feature), a spatial structural relationship between the abnormal points, and a spatial structural relationship between the target points and the abnormal points. Moreover, on the basis of the position feature classifier and the structural feature classifier, a position score and a structural score are scored for a plurality of candidate points for one target point to determine a classification probability that the candidate point belongs to the target point or the reference point. Consequently, a candidate point having a position score and a structural score satisfying a preset condition is selected as a target point, and the target point is output as a feature point. This enables accurate detection of a plurality of feature points in a medical image.

Furthermore, in accordance with the medical image processing apparatus and the medical image processing method according to the second embodiment, even when it is not possible to select a positional feature or a structural feature that follows a specific distribution in a medical image, a plurality of feature points in the medical image can be accurately detected by classifying target points and abnormal points at candidate points with a classifier.

Third Embodiment

Figure 11:
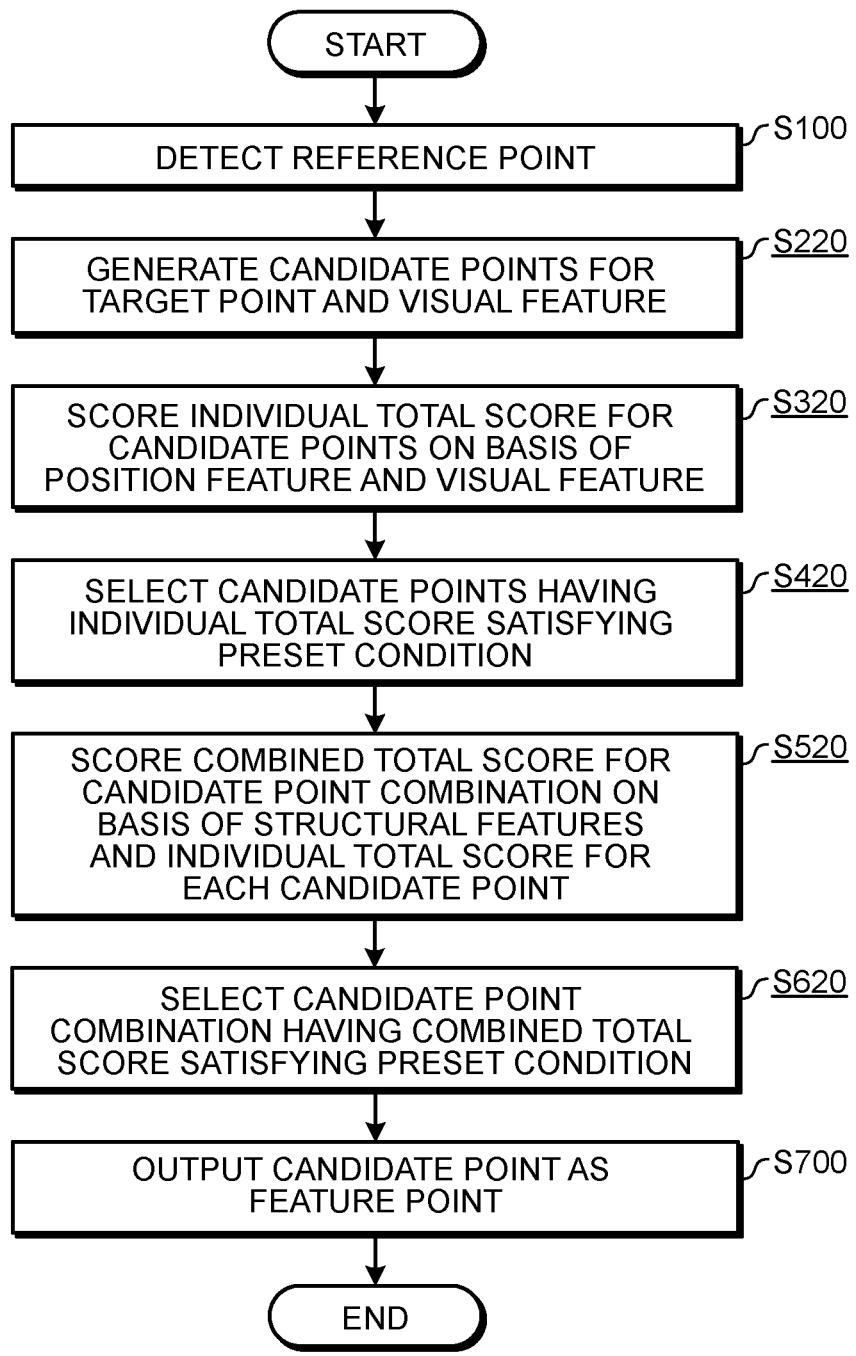
FIG. 11 is a flowchart illustrating the steps of a detection stage according to a third embodiment.

Next, a medical image processing apparatus and a medical image processing method according to a third embodiment are described on the basis of FIG. 11. FIG. 11 is a flowchart illustrating steps S100, S220, S320, S420, S520, S620, and S700 of a detection stage according to the third embodiment. In the third embodiment, only steps different from those in the first embodiment are described, and the same steps as those in the first embodiment are denoted by the same reference numerals in FIG. 11 and description thereof is omitted. The same steps are, for example, steps S100 and S700.

At step S220, the candidate point generation unit 20 generates a plurality of candidate points for the target point and outputs a visual prediction probability of the candidate points.

Taking a target point A as an example, the candidate point generation unit 20 generates a plurality of candidate points $D_{An}$ for the target point A, and outputs, for each of the candidate points $D_{An}$, a visual prediction probability $Prob_{An}$ of corresponding visual features as visual feature similarity of the candidate points $D_{An}$. The visual features include information extracted from a medical image, such as luminance, edge morphology, and patterns. Subsequently, the procedure proceeds to step S320.

At step S320, the position score unit 30 scores an individual total score for the candidate points on the basis of the position features and the visual features.

Specifically, the position score unit 30 calculates the position features and the position feature distributions and evaluates the positions of the candidate points, as in the first embodiment. For example, the position score unit 30 calculates position scores $S_{DAn\_F1}$, $S_{DAn\_F2}$, and $S_{DAn\_F3}$ of the candidate points $D_{An}$ on the basis of the position features $F_1$, $F_2$, and $F_3$, respectively. Subsequently, the position score unit 30 assigns different weight coefficients to the position scores $S_{DAn\_F1}$, $S_{DAn\_F2}$, and $S_{DAn\_F3}$ of the position features and the visual feature probability $Prob_{An}$ and calculates an individual total score SA, of the candidate points DAD by adding the position scores weighted by the weight coefficients by the following equation (4):

$$S_{An}=\lambda_1 S_{DAn\_F1}+\lambda_2 S_{DAn\_F2}+\lambda_3 S_{DAn\_F3}+\lambda_4 Prob_{An} \qquad (4)$$

where, λ indicates a weight coefficient. For example, the position score unit 30 assigns a higher weight coefficient to a highly reliable positional feature or visual feature. Subsequently, the procedure proceeds to step S420.

At step S420, the position score unit 30 selects candidate points having an individual total score satisfying a preset condition and outputs the selected candidate points to the structure score unit 40. Since the specific selection method is the same as that in the first embodiment, description thereof is omitted. Subsequently, the procedure proceeds to step S520.

At step S520, the structure score unit 40 scores a combined total score for the candidate point combination on the basis of the structural features and the individual total score of each candidate point.

Taking target points A, B, and C as an example, and assuming that the candidate point generation unit 20 has generated the candidate points $D_{An}$, $D_{Bn}$, and $D_{Cn}$ for the target points A, B, and C at step S220, the structure score unit 40 calculates structural scores $S_{n\_F1}$, $S_{n\_F2}$, $S_{n\_F3}$ for each candidate point combination n ($D_{An}$, $D_{Bn}$, $D_{Cn}$) on the basis of the structural features $F_4$, $F_5$, and $F_6$. Assuming that at step S320, the position score unit 30 has calculated individual total scores $S_{An}$, $S_{Bn}$, and $S_{Cn}$ for the candidate points $D_{An}$, $D_{Bn}$, and $D_{Cn}$, respectively, the structure score unit 40 calculates the combined total score Sn for the candidate point combination n ($D_{An}$, $D_{Bn}$, $D_{Cn}$) by the following equation (5):

$$S_n = \lambda_1 S_{n\_F1} + \lambda_2 S_{n\_F2} + \lambda_3 S_{n\_F3} + \lambda_4 S_{An} + \lambda_5 S_{Bn} + \lambda_6 S_{Cn} \quad (5)$$

where, λ indicates a weight coefficient. Subsequently, the procedure proceeds to step S620.

At step S620, the structure score unit 40 selects candidate points included in a candidate point combination having a combined total score satisfying a preset condition, and outputs the selected candidate points to the output unit 60. Since the specific selection method is the same as that in the first embodiment, description thereof is omitted. Subsequently, the procedure proceeds to step S700.

At step S700, the output unit 60 outputs the selected candidate points as a feature point. This completes the flow of the third embodiment.

Also in the third embodiment, as in the first embodiment, the order of scoring the position score and scoring the structural score may be interchanged.

In accordance with the medical image processing apparatus and the medical image processing method according to the third embodiment described above, by combining visual feature similarity indicating a visual prediction probability with position features and structural features on the basis of visual features in a medical image, an individual total score can be scored for candidate points and a combined total score for a candidate point combination. This enables accurate detection of a plurality of feature points in a medical image.

For example, in a medical image of a postoperative subject, the position feature score of an interference point may be higher than that of a target point. Even in such a case, an interference point having a high position score can be excluded by scoring the total score using visual feature similarity, and a plurality of feature points in medical images can be accurately detected.

Modification

Each of the above-described embodiments is given as an example, and the medical image processing apparatus and the medical image processing method according to the present application are not limited to the configurations described in each embodiment.

For example, in each embodiment, the medical image processing apparatus may further include an updating unit that updates, by online learning, a detection model used for calculating a position feature distribution and a structural feature distribution, and a detection model used for learning position and structural feature classifiers. This makes it possible to obtain a position score and a structural score that are more adaptive to a current data set.

The target points, the candidate points, the reference points, and the like used in the above description are examples for describing the image processing procedure according to the present embodiment, and it is not intended to limit their positions, formats, numbers, and the like. Their specific positions, formats, numbers, and the like are not limited as long as the medical image processing apparatus and the medical image processing method according to the present embodiment can be implemented.

Furthermore, the reference point detection unit 10, the candidate point generation unit 20, the position score unit 30, the structure score unit 40, the feature distribution calculation unit 50, the output unit 60 and the classifier learning unit 70 in each embodiment are implemented by, for example, processing circuitry such as a processor. In such a case, processing functions of each of these processing units are stored in a storage unit (memory) in the form of computer programs that can be executed by a computer, for example. The processing circuitry reads and executes each computer program stored in the storage unit, thereby implementing processing functions corresponding to each computer program. In other words, the medical image processing apparatus in each embodiment has the functional configurations illustrated in FIG. 1 and FIG. 8 in a state in which the processing circuitry reads each computer program. In such a case, the processing of each step illustrated in FIG. 2, FIG. 3, FIG. 5 to FIG. 7, and FIG. 9 to FIG. 11 is implemented, for example, by the processing circuitry that reads a computer program corresponding to each processing function from the storage unit and executes the computer program.

Furthermore, in each embodiment, the processing circuitry is not limited to being implemented by a single processor, but may be configured by combining a plurality of independent processors, and respective processors may implement respective processing functions by executing respective computer programs. Furthermore, the processing functions of each processing unit may be implemented by being appropriately distributed or integrated into single processing circuitry or a plurality of processing circuities. The processing functions of each processing unit may be implemented only by hardware such as circuits, only by software, or by a mixture of hardware and software. Although an example in which the computer program corresponding to each processing function is stored in a single storage circuit has been described, the embodiment is not limited thereto. For example, a computer program corresponding to each processing function may be distributed and stored in a plurality of storage circuits, and each processing unit may be configured to read each computer program from each storage circuit and execute the read computer program.

Furthermore, the term "processor" used in the description of the aforementioned embodiment, for example, means a circuit such as a central processing unit (CPU), a graphics processing unit (GPU), an application specific integrated circuit (ASIC), or a programmable logic device (for example, a simple programmable logic device (SPLD)), a complex programmable logic device (CPLD), and a field programmable gate array (FPGA)). Instead of storing the computer programs in the storage circuit, the computer programs may be directly incorporated in the circuit of the processor. In this case, the processor implements the functions by reading and executing the computer programs incorporated in the circuit. Each processor of the present embodiment is not limited to being configured as a single circuit for each processor, and one processor may be configured by combining a plurality of independent circuits to implement the functions thereof.

The computer program to be executed by the processor is provided by being incorporated in advance in a read only memory (ROM), a storage circuit, and the like. The computer program may be provided by being recorded on a computer readable non-transitory storage medium, such as a CD (compact disc)-ROM, a flexible disk (FD), a CD-R (recordable), and a digital versatile disc (DVD), in a file format installable or executable in these devices. Furthermore, the computer program may be provided or distributed by being stored on a computer connected to a network such as the Internet and downloaded via the network. For example, the computer program is configured as a module including the aforementioned each processing function. As actual hardware, the CPU reads and executes the computer program from the storage medium such as a ROM, so that each module is loaded on a main storage device and generated on the main storage device.

Furthermore, in the embodiments described above, each component of each device illustrated in the drawings is a functional concept, and does not necessarily have to be physically configured as illustrated in the drawings. That is, the specific form of dispersion or integration of each device is not limited to that illustrated in the drawings, but can be configured by functionally or physically dispersing or integrating all or part thereof in arbitrary units, depending on various loads and usage conditions. Moreover, each processing function performed by each device can be implemented in whole or in part by a CPU and a computer program that is analyzed and executed by the CPU, or by hardware using wired logic.

Of the processes described in the embodiments above, all or part of the processes described as being performed automatically can be performed manually, or all or part of the processes described as being performed manually can be performed automatically by known methods. Other information including processing procedures, control procedures, specific names, and various data and parameters shown in the above documents and drawings may be changed as desired, unless otherwise noted.

The various types of data handled herein are typically digital data.

According to at least one of the embodiments described above, a plurality of feature points in a medical image can be accurately detected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing apparatus for detecting a plurality of feature points in a medical image, the medical image processing apparatus comprising:
    processing circuitry configured to
    detect, for each of a plurality of target points corresponding to the feature points, a reference point having a spatial correlation with the target point in the medical image,
    generate a plurality of candidate points corresponding to the target point for each of the target points by using a detection model,
    score, for each of the target points, a position score for the candidate points based on a position feature indicating a spatial position relationship between the target point and the reference point in the medical image, and select, for each of the target points, a candidate point having the position score satisfying a preset condition, increase a detection rate of the feature points in the medical image by scoring, for each of a plurality of candidate point combinations obtained by combining the candidate points among the target points, a structural score for the candidate point combination based on a structural feature indicating a spatial structural relationship between the target points in the medical image, and select, for each of the candidate point combinations, a candidate point combination having the structural score satisfying a preset condition, and
    output, via a display, the feature points in the medical image based on the selected candidate point and candidate point combination.

2. The medical image processing apparatus according to claim 1, wherein the processing circuitry is further configured to
    select a plurality of candidate points having the position score satisfying the condition from the generated candidate points,
    select a candidate point combination having the structural score satisfying the condition from a plurality of candidate point combinations obtained by combining the selected candidate points, and
    output a plurality of candidate points included in the selected candidate point combination as the feature points.

3. The medical image processing apparatus according to claim 1, wherein the processing circuitry is further configured to
    select a candidate point combination having the structural score satisfying the condition from a plurality of candidate point combinations obtained by combining the generated candidate points,
    select a plurality of candidate points having the position score satisfying the condition from a plurality of candidate points included in the selected candidate point combination, and
    output the selected candidate points as the feature points.

4. The medical image processing apparatus according to claim 1, wherein the processing circuitry is further configured to
    calculate a position feature distribution indicating a probability distribution of the position feature and a structural feature distribution indicating a probability distribution of the structural feature, based on a learning data set of the detection model,
    score the position score for the candidate points based on the position feature and the position feature distribution corresponding to the position feature, and
    score the structural score for the candidate point combination based on the structural feature and the structural feature distribution corresponding to the structural feature.

5. The medical image processing apparatus according to claim 1, wherein the processing circuitry is further configured to
    calculate a combined position feature distribution indicating a probability distribution of a combined position feature in which a plurality of spatial position relationships are combined as the position feature and a combined structural feature distribution indicating a probability distribution of a combined structural feature in which a plurality of spatial structural relationships are combined as the structural feature, based on a learning data set of the detection model, score the position score for the candidate points based on the combined position feature and the combined position feature distribution corresponding to the combined position feature, and score the structural score for the candidate point combination based on the combined structural feature and the combined structural feature distribution corresponding to the combined structural feature.

6. The medical image processing apparatus according to claim 1, wherein the processing circuitry is further configured to learn a position feature classifier based on the position feature and a spatial position relationship between an abnormal point and the reference point in the medical image and learns a structural feature classifier based on the structural feature, a spatial structural relationship between a plurality of abnormal points in the medical image, and a spatial structural relationship between the target points and the abnormal points in the medical image, score the position score for the candidate points based on the position feature classifier, and score the structural score for the candidate point combination based on the structural feature classifier.

7. The medical image processing apparatus according to claim 1, wherein the processing circuitry is further configured to generate a visual feature of each of the candidate points for each of the target points by using the detection model, score an individual total score as the position score for the candidate points based on the position feature and the visual feature, and score a combined total score as the structural score for the candidate point combination based on the structural feature and the individual total score.

8. The medical image processing apparatus according to claim 4, wherein the processing circuitry is further configured to update the position feature distribution and the structural feature distribution by online learning based on the position score and the structural score.

9. The medical image processing apparatus according to claim 6, wherein the processing circuitry is further configured to update position feature classifier and the structural feature classifier by online learning based on the position score and the structural score.

10. A medical image processing method for detecting a plurality of feature points in a medical image, the medical image processing method comprising:

detecting, for each of a plurality of target points corresponding to the feature points, a reference point having a spatial correlation with the target point in the medical image;

generating a plurality of candidate points corresponding to the target point for each of the target points by using a detection model;

scoring, for each of the target points, a position score for the candidate points based on a position feature indicating a spatial position relationship between the target point and the reference point in the medical image, and selecting, for each of the target points, a candidate point having the position score satisfying a preset condition;

increasing a detection rate of the feature points in the medical image by scoring, for each of a plurality of candidate point combinations obtained by combining the candidate points among the target points, a structural score for the candidate point combination based on a structural feature indicating a spatial structural relationship between the target points in the medical image, and selecting, for each of the candidate point combinations, a candidate point combination having the structural score satisfying a preset condition; and outputting, via a display, the feature points in the medical image based on the selected candidate point and candidate point combination.

11. The medical image processing method according to claim 10, wherein the selecting the candidate point includes selecting a plurality of candidate points having the position score satisfying the condition from the generated candidate points, the selecting the candidate point combination includes selecting a candidate point combination having the structural score satisfying the condition from the selected candidate points, and the outputting the feature points includes outputting a plurality of candidate points included in the selected candidate point combination as the feature points.

12. The medical image processing method according to claim 10, wherein the selecting the candidate point combination includes selecting a candidate point combination having the structural score satisfying the condition from the generated candidate points, the selecting the candidate point includes selecting a plurality of candidate points having the position score satisfying the condition from a plurality of candidate points included in the selected candidate point combination, and the outputting the feature points includes outputting the selected candidate points as the feature points.

13. The medical image processing method according to claim 10, further comprising:

calculating a position feature distribution indicating a probability distribution of the position feature and a structural feature distribution indicating a probability distribution of the structural feature, based on a learning data set of the detection model, wherein the selecting the candidate point includes scoring the position score for the candidate points based on the position feature and the position feature distribution corresponding to the position feature, and the selecting the candidate point combination includes scoring the structural score for the candidate point combination based on the structural feature and the structural feature distribution corresponding to the structural feature.

\* \* \* \* \*